(12) United States Patent
Fabbri et al.

(10) Patent No.: US 11,859,591 B2
(45) Date of Patent: Jan. 2, 2024

(54) METHOD FOR CONTROLLING A GASOLINE INTERNAL COMBUSTION ENGINE, HAVING TWO SPARK PLUGS FOR EACH CYLINDER

(71) Applicant: Maserati S.p.A., Modena (IT)

(72) Inventors: Marco Fabbri, Modena (IT); Filippo Carra, Sant'Agata Bolognese (IT); Lorenzo Paolucci, Ferrara (IT); Simone Ferrante, Modena (IT); Francesco Marcigliano, Modena (IT)

(73) Assignee: Maserati S.p.A., Modena (IT)

( * ) Notice: Subject to any disclaimer, the term of this patent is extended or adjusted under 35 U.S.C. 154(b) by 0 days.

(21) Appl. No.: 18/170,005

(22) Filed: Feb. 16, 2023

(65) Prior Publication Data

US 2023/0265820 A1 Aug. 24, 2023

(30) Foreign Application Priority Data

Feb. 18, 2022 (IT) .......................... 102022000003029

(51) Int. Cl.
  *F02P 5/15* (2006.01)
  *F02P 15/02* (2006.01)
  *F02P 5/153* (2006.01)

(52) U.S. Cl.
  CPC .............. *F02P 5/153* (2013.01); *F02P 15/02* (2013.01)

(58) Field of Classification Search
  CPC ............... F02P 5/15; F02P 5/153; F02P 15/02
  See application file for complete search history.

(56) References Cited

U.S. PATENT DOCUMENTS

2007/0221164 A1 9/2007 Ashida et al.
2019/0078498 A1* 3/2019 Bedogni ............. F02B 19/1019

FOREIGN PATENT DOCUMENTS

EP  3453856 B1  10/2019
WO  9413946 A1  6/1994

OTHER PUBLICATIONS

Search Report dated Aug. 16, 2022. 2 pages.

* cited by examiner

*Primary Examiner* — John Kwon
*Assistant Examiner* — Johnny H Hoang
(74) *Attorney, Agent, or Firm* — RMCK Law Group PLC

(57) ABSTRACT

In a gasoline internal combustion engine having a first and second spark plugs for each cylinder, associated, respectively, with a combustion pre-chamber and with a combustion chamber, engine crank angle of ignition (ECAI) of the first and second spark plugs are controlled as a function of engine load and engine rotation speed, and as a function of a required value of torque delivered by the engine, referring to a single normalized reference surface, which is the same for any operating point of the engine, and which supplies efficiency of the engine as a function of a difference between ECAI of the first spark plug and an optimal value of this angle at which the efficiency becomes maximum, and as a function of a difference between the ECAI of the second spark plug and an optimal value of this angle at which the efficiency becomes maximum.

9 Claims, 11 Drawing Sheets

METHOD FOR CONTROLLING A GASOLINE INTERNAL COMBUSTION ENGINE, HAVING TWO SPARK PLUGS FOR EACH CYLINDER

CROSS-REFERENCE TO RELATED APPLICATION

This application claims priority to Italian Patent Application No. 102022000003029 filed Feb. 18, 2022. The disclosure of the above application is incorporated herein by reference in its entirety.

FIELD OF THE INVENTION

The present invention relates to a method for controlling a gasoline internal combustion engine, wherein the engine is of the type comprising:
- a crankcase having a plurality of cylinders and a cylinder head defining a combustion chamber and a combustion pre-chamber associated with each cylinder, and a plurality of pistons movable within the cylinders and operatively connected to a engine shaft,
- a first spark plug and a second spark plug associated with the combustion pre-chamber and with the combustion chamber of each cylinder, respectively.

PRIOR ART

An engine of the type indicated above has, for example, been the subject of the European patent EP 3 453 856 B1 by the same Applicant.

The present invention relates to a method for controlling an engine of this type. Of course, the invention is of general application and can be used in any engine having two spark plugs per cylinder, not necessarily, therefore, in the engine illustrated in the document identified above, which constitutes only one example of application of the invention.

Object of the Invention

The object of the present invention is to develop a new method for controlling the operation of a gasoline internal combustion engine with two spark plugs per cylinder, which is capable of obtaining maximum engine efficiency in all engine operating conditions, through a control method that is as simple as possible and—at the same time—reliable.

SUMMARY OF THE INVENTION

With a view to achieving this object, the invention relates to a method for checking the operation of a gasoline internal combustion engine of the type indicated at the beginning of the present description, said method comprising the operations of:
- controlling, for each cylinder, in each cylinder operating cycle, the ignition of the first spark plug at a given engine crank angle SA1 and the ignition of the second spark plug at a given engine crank angle SA2, depending on the engine load and the engine rotational speed and depending on the required value of a torque delivered by the engine,
- determining said engine crank angle SA1 of ignition of the first spark plug and said engine crank angle SA2 of ignition of the second spark plug on the basis of the following operations:
- empirically detecting, for said engine, a plurality of three-dimensional reference surfaces, in a diagram with three orthogonal axes x, y, z, wherein each three-dimensional reference surface corresponds to a respective engine operating point, that is, to a determined pair of values of engine rotational speed and engine load, and wherein each of said three-dimensional reference surfaces provides, on the z axis, a value IMEPh of a gross indicated mean effective pressure obtained at each cycle inside the cylinder, (or other equivalent parameter indicative of the work generated in the step of the operating cycle in the cylinder which goes from the end of the intake step to the beginning of the discharge step), as a function of the value reported on the x axis of the engine crank angle SA1 of ignition of the first spark plug and the value reported on the y axis of the engine crank angle SA2 of ignition of the second spark plug,
- empirically determining, for each of the aforesaid engine operating points, and as a function of the engine crank angle SA1 at which the first spark plug is ignited and the engine crank angle SA2 at which the second spark plug is ignited, the value MFB50 of the engine crank angle at which 50% of the mass of fuel is burnt,
- on the basis of these empirical measurements, for each of the aforesaid engine operating points, defining a respective IMEPh/MFB50 curve of the variation of said gross indicated mean effective pressure IMEPh as a function of the value MFB50 of the engine crank angle at which 50% of the mass of fuel is burnt,
- calculating, for each point on said respective IMEPh/MFB50 curve, the ratio between the value of IMEPh at that point and a maximum value (IMEPh opt) of IMEPh along said curve, where said maximum value corresponds to a maximum point on said curve or to a maximum point defined by an extension of said curve obtained by extrapolation,
- taking said ratio as representative of the efficiency of the engine, corresponding substantially to the ratio between a torque delivered by the engine and an optimum torque which would be delivered for said maximum value (IMEPh opt) of IMEPh,
- on the basis of said calculation, transforming each of aforesaid three-dimensional reference surfaces, into a transformed three-dimensional surface, which, in a diagram with axes x, y, z, provides on the z axis the value of said efficiency of the engine, as a function of the values SA1 of the engine crank angle of ignition of the first spark plug reported on the x axis and of the values SA2 of the engine crank angle of ignition of the second spark plug reported on the y axis,
- translating each of said transformed three-dimensional surfaces, parallel to the x-axis and the y-axis, assigning:
- to the x-axis the values of the differential (Delta SA1) between an optimum value (SA1 opt) of the ignition crank angle of the first spark plug for which said efficiency is unitary, and the value SA1 of the ignition crank angle of the first spark plug, and
- to the y-axis the values of the differential (Delta SA2) between an optimum value (SA2 opt) of the engine crank angle of ignition of the second spark plug for which said efficiency is unitary, and the value SA2 of the ignition engine crank angle of the second spark plug,
- defining a single normalized reference surface that approximates all the aforesaid transformed and translated three-dimensional surfaces, said single normalized reference surface being used to determine, as a function of the engine operating point, the relationship between the torque delivered by the engine and the values of the engine crank angle of ignition of the first spark plug and of the engine crank angle of ignition of the second spark plug, and determining the values of the engine crank angle of ignition of the first spark plug and of the engine crank angle of ignition of the second spark plug using said single normalized reference surface, so as to reach a predetermined target value of the torque delivered at a given operating point of the engine.

In the present description, and in the claims that follow, the expression "gross indicated mean effective pressure (IMEPh)" is used to indicate the indicated effective mean pressure during the operating cycle in the cylinder which goes from the end of the intake step to the beginning of the discharge step.

In the method according to the invention, starting from determined values SA1 and/or SA2 of the engine crank angle of ignition of the first spark plug and the engine crank angle of ignition of the second spark plug, and for a determined engine operating point, the optimal torque (Torque opt) that the engine can deliver is determined on the basis of the IMEPH/MFB50 curve corresponding to the engine operating point, by referring to a maximum value (IMEPh opt) assumed by IMEPh along said curve, where said maximum value corresponds to a maximum point of said curve or to a maximum point defined by an extension of said curve obtained by extrapolation.

According to another characteristic, for a determined engine operating point, optimal values SA1 opt and SA2 opt of the engine crank angle of ignition of the first spark plug and the engine crank angle of ignition of the second spark plug are determined for which the value of IMEPh given by said IMEPh/MFB50 curve is a maximum value, wherein said maximum value corresponds to a maximum point defined by said curve or to a maximum point defined by an extension of said curve obtained by extrapolation In the method according to the invention, starting from determined values SA1 and SA2 of the engine crank angle of ignition of the first spark plug and the engine crank angle of ignition of the second spark plug, and upon determining the optimal values SA1 opt and SA2 opt of said engine crank angles, the differentials SA1 opt−SA1 and SA2 opt−SA2 are calculated. On the basis of the aforesaid single normalized reference surface, a value of efficiency of the engine is determined as a function of said calculated values of the differentials SA1 opt−SA1 and SA2 opt−SA2. On the basis of said efficiency value and of said determined value of the optimal torque (Torque opt) which the engine can deliver, the value of the torque delivered by the engine is determined.

According to another characteristic of the invention, in any engine operating condition, starting from given values of SA1 and SA2 of the engine crank angle of ignition of the first spark plug and the engine crank angle of ignition of the second spark plug, said values are varied on the basis of said single normalized reference surface, moving on said surface according to a predetermined path, so as to arrive at a point on the normalized reference surface with an efficiency value corresponding to a given target value of the torque delivered by the engine.

Said predetermined path on the xy plane of the diagram of said normalized reference surface corresponds to a sequence of lines that, for example, includes at least one straight line inclined at 45° with respect to the x, y axes, along which the variation of the differential SA1 opt−SA1 is equal to the variation of the differential SA2 opt−SA2.

Preferably, the aforesaid predetermined path is chosen on the basis of empirical data, so as to promote stability of the combustion so as to avoid a cyclic dispersion of the torque delivered by the engine.

The invention also relates to an internal combustion engine including an electronic controller configured to implement the method described above.

BRIEF DESCRIPTION OF THE DRAWINGS

Further characteristics and advantages of the invention will become apparent from the description that follows with reference to the attached drawings, provided purely by way of non-limiting example, wherein.

DETAILED DESCRIPTION OF PREFERRED EMBODIMENTS

Figure 1:
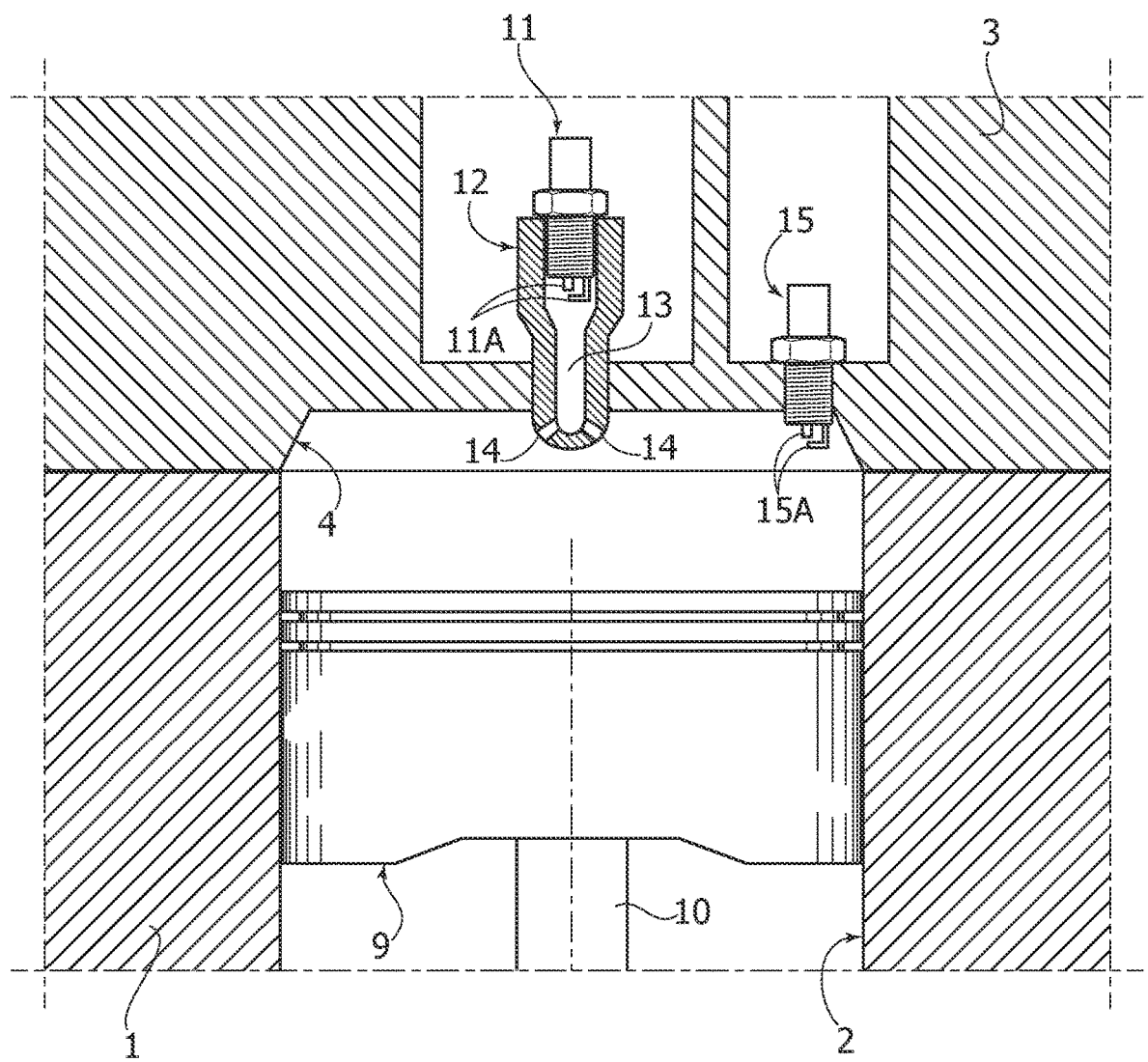
FIGS. 1, 2 are schematic cross-sectional views of an internal combustion engine, having two spark plugs for each cylinder, of the type that has formed the subject of the European patent EP 3 453 856 B1 by the same Applicant, to which the method is applicable according to the present invention.
Figure 2:
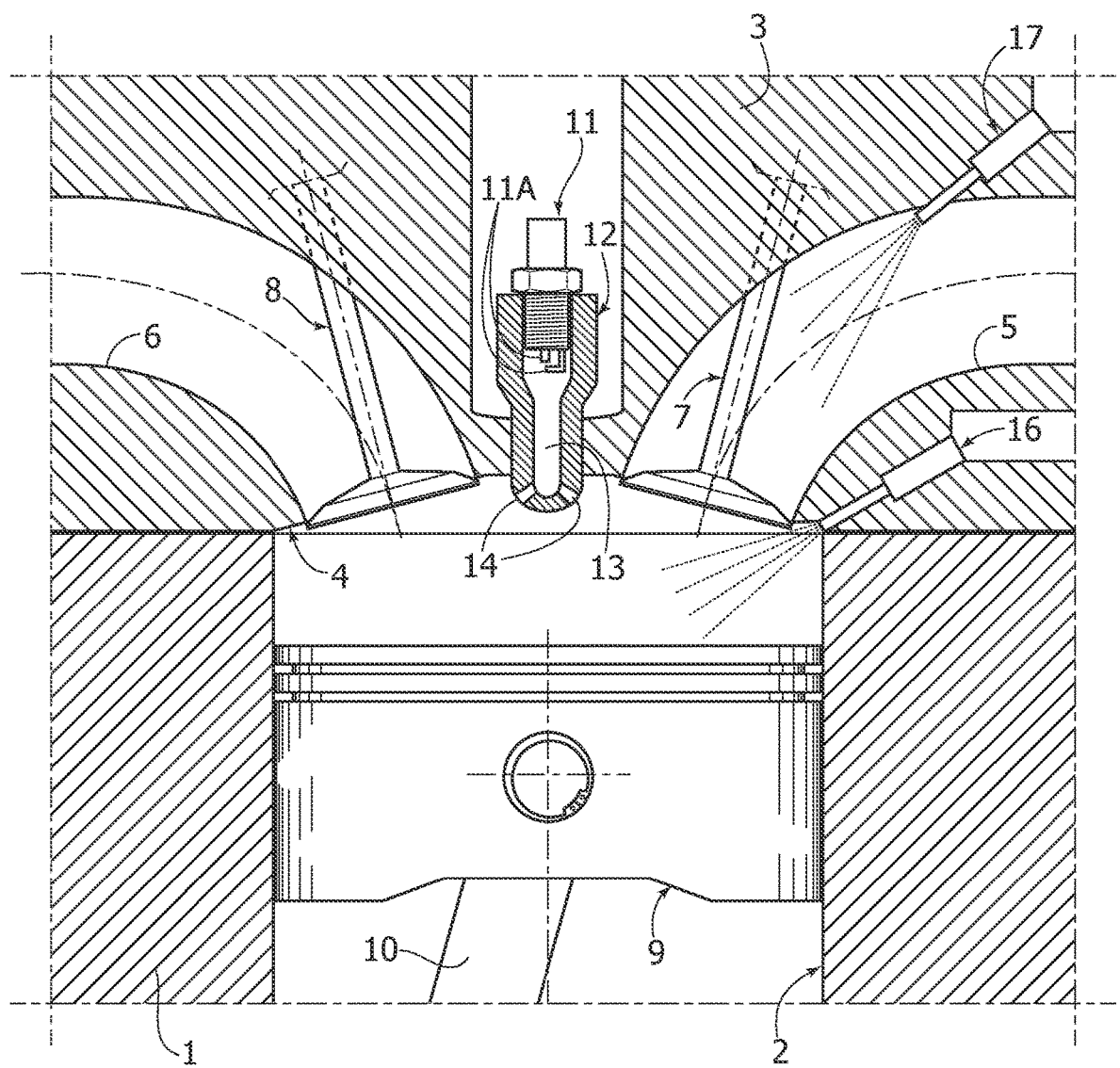

FIGS. 1, 2 of the attached drawings show schematic views of an embodiment example of the engine described in the Applicant's European patent EP 3 453 856 B1.

Of course, this engine is described here as an example of an engine to which the present invention is applicable. However, as already indicated, the method of the invention is generally applicable to any engine with two spark plugs per cylinder.

FIG. 1 is a schematic cross-sectional view of the engine, in a sectional plane showing the combustion pre-chamber with the first spark plug (which in the example is centrally located on the cylinder axis), and the main combustion chamber with the second spark plug (which in the example is lateral to the cylinder axis).

FIG. 2 is a further cross-sectional view of the engine of FIG. 1 in a sectional plane showing the combustion pre-chamber with the associated spark plug, the intake duct and the exhaust duct associated with the cylinder, and respective gasoline injectors, one associated with an intake duct and the other directly associated with the main combustion chamber.

In accordance with the conventional technique, the engine illustrated in FIGS. 1, 2 comprises a crankcase 1 defining a plurality of cylinders 2 (one of which is illustrated in the drawings). Of course, the engine configuration described below with reference to a cylinder is repeated on each of the other cylinders of the engine. Still in accordance with the conventional technique, a cylinder head 3 is mounted on the crankcase 1, in which, at each cylinder 2 the following are formed: a combustion chamber 4, at least one intake duct 5, and at least one exhaust duct 6, with which respective intake and discharge valves 7, 8 are associated (see FIG. 2).

Conventionally, within each cylinder 2, a piston 9 is movable, produced according to any known configuration, connected by a piston rod 10 (shown only partially in the drawings) to a respective crank of the engine crankshaft (not shown).

Still with reference to FIGS. 1, 2, for each cylinder 2, a first spark plug 11 is provided, mounted within a support element 12 defining a combustion pre-chamber 13 inside it. The support element 12 is configured to be mounted within a seat of the engine head 3, which leads into the combustion chamber 4. The support element 12 has a relatively elongated configuration, with one end carrying the spark plug 11 and the opposite end facing the combustion chamber 4 and having a plurality of orifices 14 for communication of the combustion pre-chamber 13 with the combustion chamber 4.

As visible in FIGS. 1, 2, in the example shown here, the combustion pre-chamber is centrally arranged with respect to the main combustion chamber 4, and has its main axis parallel to the axis of the respective cylinder. However, different positions and orientations of the pre-chamber 13 with respect to the cylinder 2 are not excluded.

One side of the combustion chamber 4 is provided with a second spark plug 15, with electrodes 15A directly facing the combustion chamber 4.

The engine described here can be designed for producing a direct injection of gasoline into the combustion chamber 4, by means of an electromagnetically-controlled injector 16 directly associated with the combustion chamber 4, or to produce an indirect injection of gasoline, by means of an electromagnetically-controlled injector 17, associated with the intake duct 5, or to produce a mixed direct and indirect injection, by providing both injector devices 16, 17.

The injector devices 16 and 17, the first spark plug 11 and the second spark plug 15 arranged for each cylinder of the engine are controlled by an electronic control unit (not illustrated).

As is apparent from the foregoing description, the engine combustion pre-chamber of the invention is of a "passive" type in that it is not associated with any device for injecting fuel or air, or a mixture of air and fuel, directly into the combustion pre-chamber 13. During operation, the combustion pre-chamber fills with the load of the cylinder that enters the combustion pre-chamber passing through the orifices 14, driven by the piston 9 during the compression step of the load in the cylinder.

In the case of the solution forming the subject of EP 3 453 856 B1, the electronic control unit is programmed to control the injector device 16 and/or the injector device 17 in order to produce an air/gasoline mixture in the combustion chamber according to a ratio essentially corresponding to a stoichiometric dose, or a richer dose than the stoichiometric dose. The electronic control unit is also programmed in such a way that the second ignition spark plug, having electrodes directly facing the combustion chamber, is only activated at low and medium engine loads to stabilize the combustion, and is inactive or kept active but without any influence on the combustion, for example, by activating it during the expansion or discharge step of the cylinder, at higher loads, As already indicated above, the present invention has been developed in particular with reference to the engine described above, but is in any case applicable in general to any gasoline internal combustion engine having two spark plugs for each cylinder.

The problem that arises in engines of this type is that of controlling the ignition of the two spark plugs of each cylinder of the engine so as to obtain maximum engine efficiency in any engine operating condition.

Figure 3:
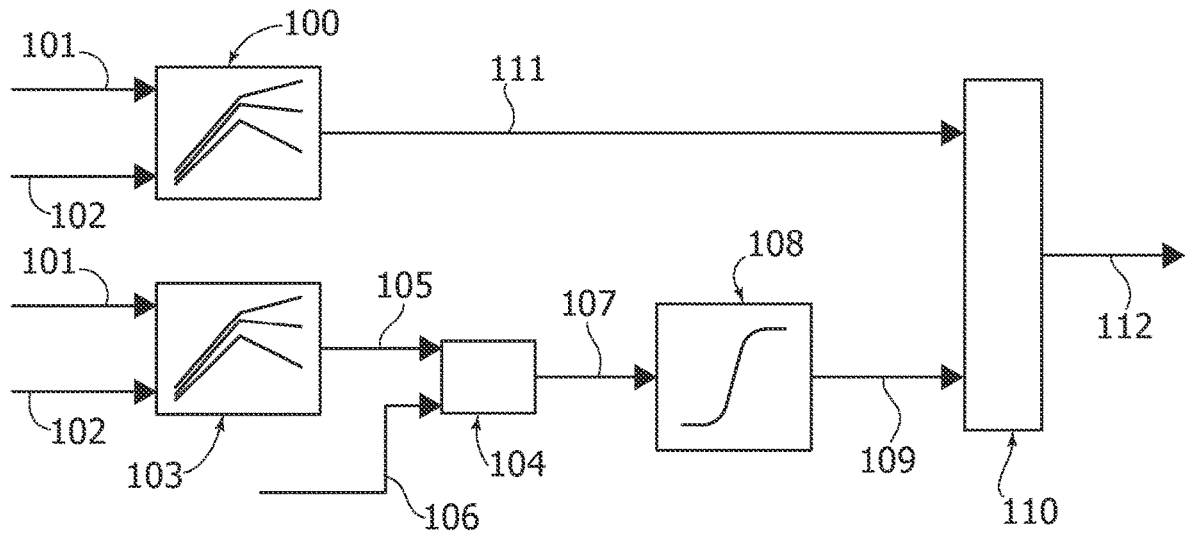
FIGS. 3, 4 are diagrams illustrating the method for calculating the torque delivered by a conventional internal combustion engine, with a single spark plug per cylinder, as a function of the engine crank angle of ignition of the spark plug.

FIG. 3 shows a block diagram of an example of a method for controlling the ignition, which can be implemented in the electronic controller of a gasoline internal combustion engine of the conventional type, having a single spark plug for each cylinder. In an engine of this type, the electronic control unit of the engine is capable of commanding, for each cylinder, in each cylinder operating cycle, the ignition of the single spark plug with which the cylinder is equipped at a determined crank angle, as a function of the operating point of the engine (that is, of the values of the engine load and of the rotation speed of the engine) and as a function of a required value of the torque delivered by the engine.

The torque (Torque) delivered by the engine is closely linked to the value of the gross mean effective pressure (IMEPh) obtained at each cycle inside the cylinder. The efficiency (n) of the engine, understood as the ratio between the torque ("Torque") delivered by the engine and the optimal torque ("Torque opt") delivered by the engine is equal to the ratio between the IMEPh in the cylinder and the maximum value IMEPh opt which can be obtained in the cylinder:

$$\eta = \text{IMEPh}/\text{IMEPh opt} \quad (1)$$

If SA is the engine crank angle at which the ignition of the single spark plug of each cylinder is commanded and SAopt is the engine crank angle of ignition of the spark plug that gives rise to the optimal value IMEPh opt in the cylinder, it follows that the efficiency of the engine is a function of the difference between the optimum ignition angle and the effective ignition angle:

$$\eta = f(\text{SAopt} - \text{SA}) \quad (2)$$

FIG. 3 is a flowchart showing the operations with which, in a gasoline internal combustion engine with a single spark plug per cylinder, the control unit can determine the value of the torque delivered by the engine as a function of the operating point of the engine, and as a function of the value of the engine crank angle which causes the ignition of the spark plug.

In FIG. 3, in block 100 reference maps are used, obtained empirically for a given engine, to supply an output signal 111 indicative of the optimal torque (Torque opt) which can be delivered by the engine as a function of signals 101 and 102 entering the block 100, respectively indicative of the engine load and engine rotation speed values. Each pair of engine load and engine speed values represents an engine operating point. The block 100 makes use of different reference maps for different engine operating points.

Again in FIG. 3, the block 103 makes use of reference maps, obtained empirically for a certain type of engine, to supply an output signal 105 indicative of the optimum engine crank angle for spark plug ignition ("SA opt") as a function of signals 101, 102 entering the block 103, which supply information on the engine load and engine rotation speed.

The block 104 receives the signal 105 containing the information relating to the value "SA opt" supplied by the block 103, and a signal 106 which supplies information on the current value of the engine crank angle "SA" which causes ignition of the spark plug. The block 104 outputs a signal 107 that supplies information on the difference Delta SA between the current engine crank angle of ignition of the spark plug and the optimum engine crank angle for ignition of the spark plug.

Figure 4:
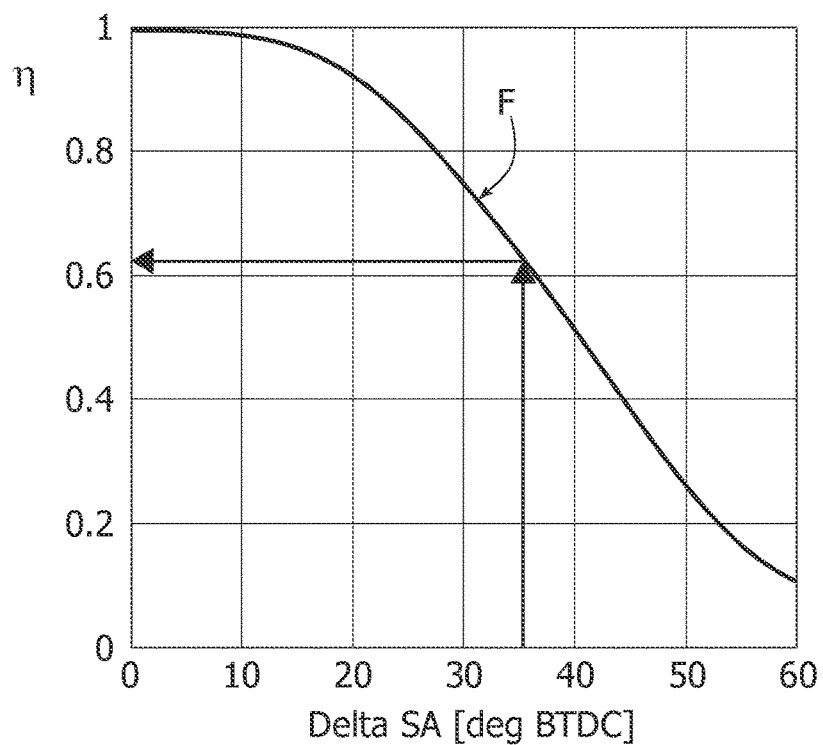

The signal 107 containing the information on the Delta SA value is sent to a block 108, in which a single normalized curve F is used (illustrated in FIG. 4), which supplies the engine efficiency as a function of the Delta SA value. The curve F is a normalized curve which is always the same whatever the operating point of the engine.

A block 110 receives at its input both the signal 111 indicative of the optimal torque (Torque opt) which can be delivered by the engine, and the signal 109 indicative of the efficiency of the engine, and emits an output signal 112 indicative of the effective torque delivered by the engine for the operating point considered (engine load and engine speed) and for the current value of the engine crank angle at which the spark plug is ignited.

Therefore, the engine control in the case of an engine having a single spark plug per cylinder is relatively simple, thanks to the fact that it is possible to refer to a single normalized curve F (FIG. 4), which gives the efficiency of the engine operating the Delta SA difference between the optimum engine crank angle for spark plug ignition and the actual engine crank angle at which the spark plug ignites.

In the case of a gasoline internal combustion engine having two spark plugs per cylinder, which can be controlled independently, the problem arises of identifying a simple and reliable way to control the engine crank angle of ignition of the first spark plug associated with the combustion pre-chamber (spark plug 11 in FIG. 1) and the engine crank angle of ignition of the second spark plug whose electrodes directly face the combustion chamber (spark plug 15 in FIG. 1) in order to obtain a required torque from the engine in any engine operating condition.

In the method according to the invention the engine crank angle SA1 of ignition of the first spark plug and the engine crank angle SA2 of ignition of the second spark plug are determined on the basis of the operations described below.

Figure 5:
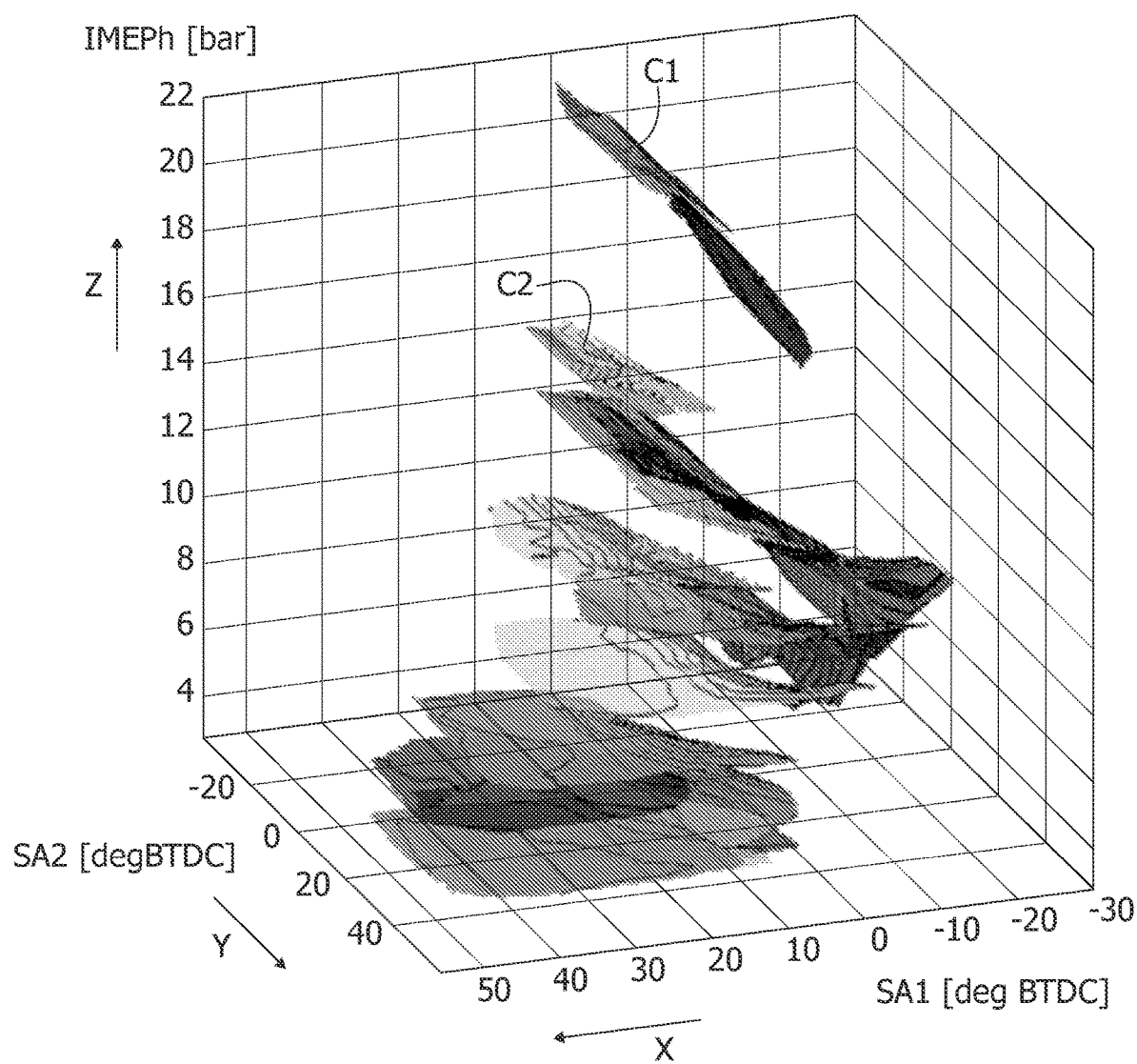
FIGS. 5-10 are diagrams and block diagrams illustrating an example of the method according to the invention.

With reference to FIG. 5 of the attached drawings, a first operation consists in detecting empirically, for a given engine, a plurality of three-dimensional reference surfaces C1, C2, . . . , Cn in a diagram with three orthogonal axes x, y, z, wherein each three-dimensional reference surface C1, C2, . . . , Cn corresponds to a respective engine operating point, i.e. to a determined pair of values of the engine rotation speed and engine load, and wherein each of the aforesaid three-dimensional reference surfaces C1, C2, . . . , Cn supplies on the z axis an IMEPh value (measured in bar) of the gross indicated mean effective pressure established at each cycle inside the cylinder, according to the value shown on the x axis of the engine crank angle SA1 of ignition of the first spark plug (measured in degrees BTDC, i.e. in degrees before the Top Dead Center of the piston in the cylinder) and the value reported on the y axis of the engine crank angle SA2 of ignition of the second spark plug (also measured in degrees BTDC, i.e. in degrees before Top Dead Center of the piston in the cylinder).

As an alternative to the above, instead of the aforesaid IMEPh parameter, it is possible to refer to another equivalent parameter, such as, for example, the work generated in the step of the operating cycle in the cylinder which goes from the end of the intake step to the beginning of the discharge step.

Figure 6:
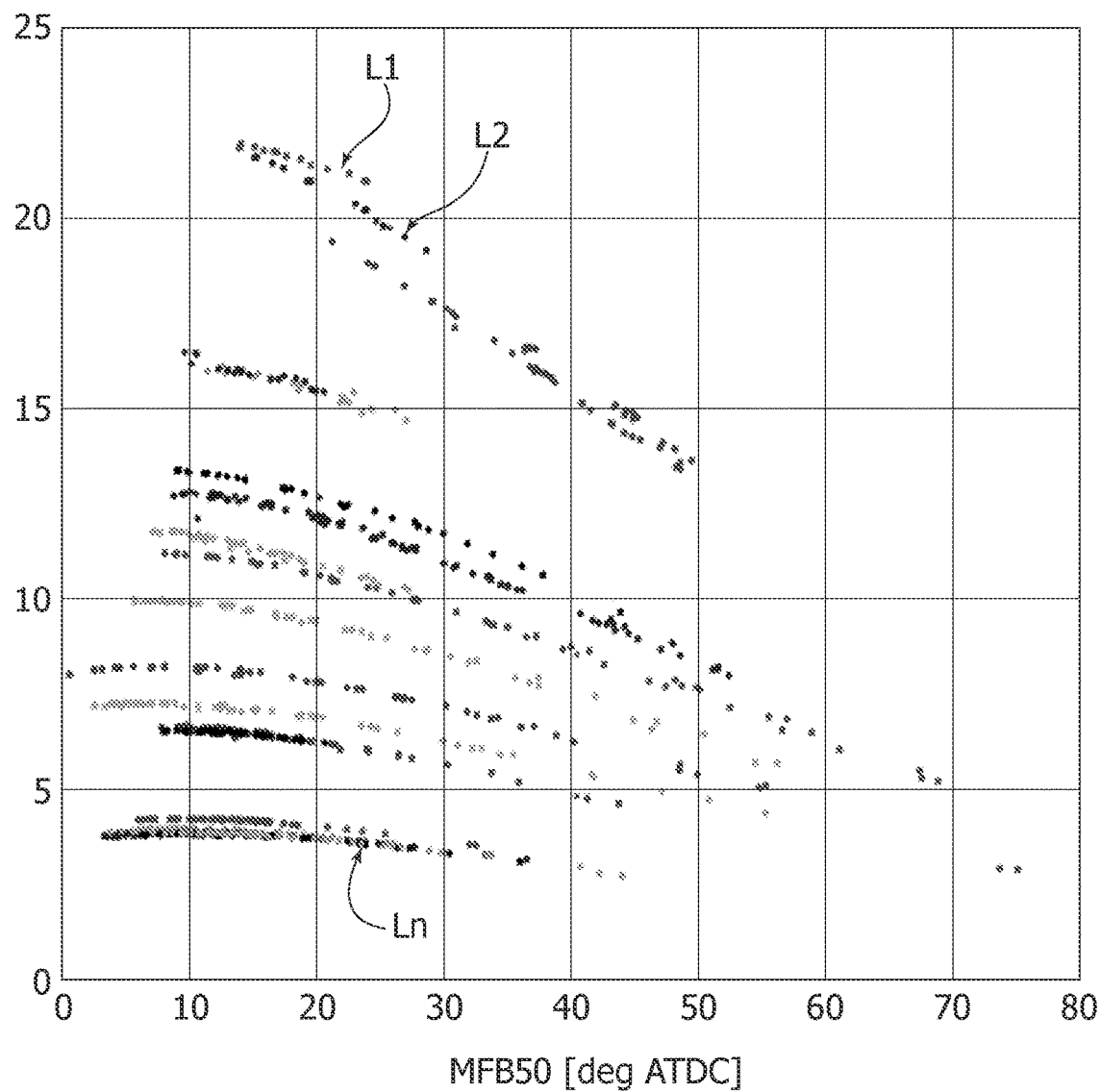

With reference to FIG. 6, a further operation envisaged in the method according to the invention consists of empirically determining, for the aforesaid engine operating points, and as a function of the engine crank angle SA1 at which the first spark plug is ignited and the engine crank angle SA2 at which the second spark plug is ignited, the value MFB50 of the engine crank angle at which 50% of the mass of fuel is burnt.

On the basis of the aforesaid empirical findings, for each of the aforesaid engine operating points, corresponding to a pair of values of the engine rotation speed and engine load, it is possible to define a respective curve IMEPh/MFB50 (in FIG. 6 these curves are indicated by L1, L2, . . . , Ln) which supplies the value IMEPh of the gross indicated mean effective pressure as a function of the value MFB50 of the engine crank angle at which 50% of the fuel mass is burnt.

With reference to FIG. 6, the values of MFB50 on the x-axis are measured in degrees ATDC, i.e. in degrees after Top Dead Center, while the ordinate values of the indicated gross mean effective pressure IMEPh are expressed in bar.

On the basis of the diagram of FIG. 6, which is obtained empirically for a given engine, the method of the invention includes the operation of calculating, for each point of an IMEPh/MFB50 curve corresponding to a given operating point of the engine, the ratio between the value of IMEPh at that point and a maximum value (IMEPh opt) of IMEPh along said curve. Maximum value of the curve means the maximum value corresponding to a maximum point of the curve (as in the case of the curve Ln in FIG. 6) or to a maximum point corresponding to an extension of the curve obtained by extrapolation (as in the case of the curves L1, L2 of FIG. 6).

In the method according to the invention, the aforesaid ratio between the value of IMEPh at a given point of a curve in the diagram of FIG. 6 and the corresponding maximum value IMEPh opt is taken as representative of the engine efficiency, since it substantially corresponds to the ratio between the torque delivered by the engine and the optimum torque that would be delivered for the aforesaid maximum value IMEPh opt of the gross indicated mean effective pressure.

Figure 7:
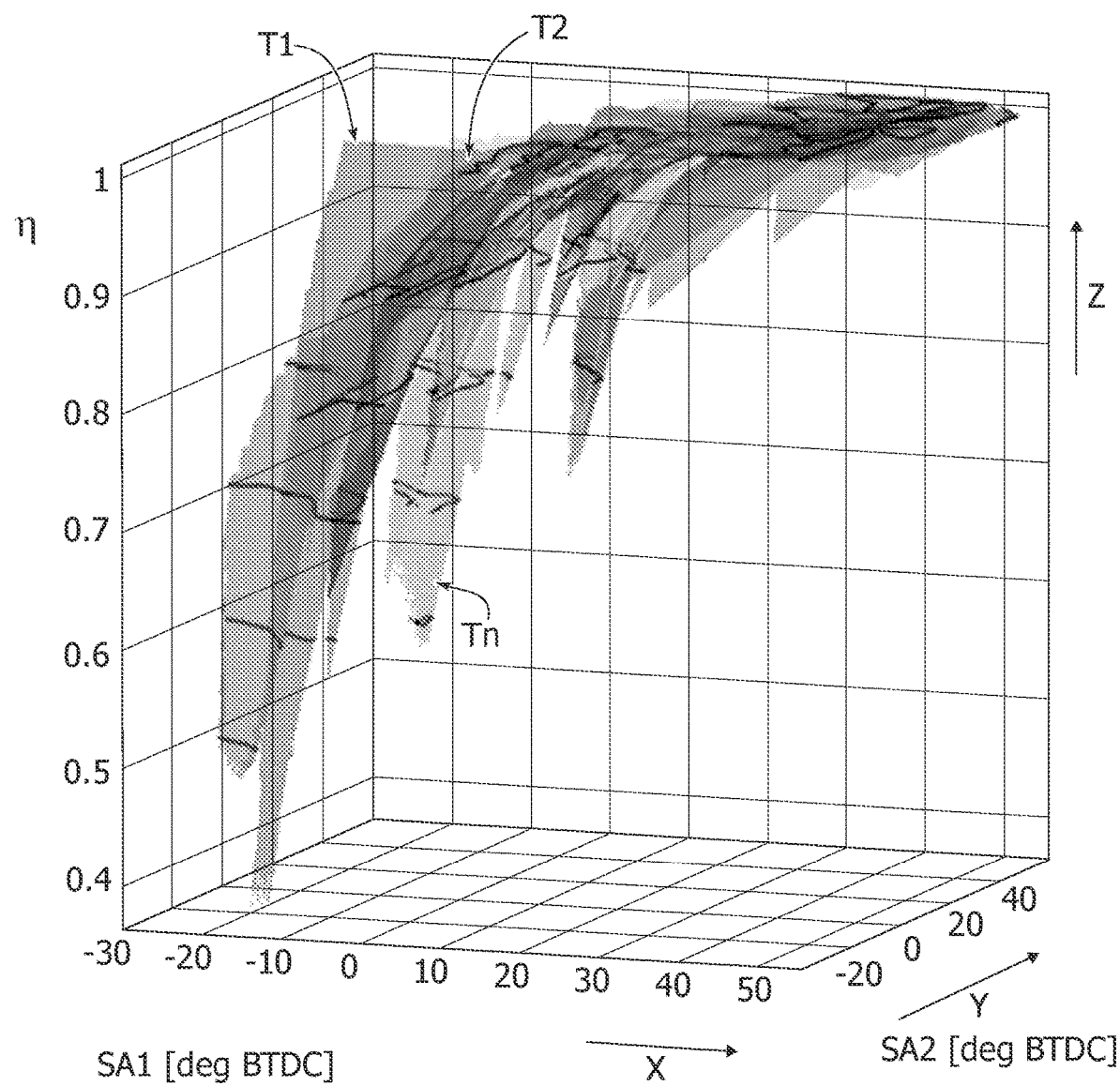

On the basis of the aforesaid calculation, the method according to the invention, therefore, includes the transformation of the aforesaid three-dimensional reference surfaces C1, C2, . . . , Cn illustrated in the diagram of FIG. 5 in transformed three-dimensional surfaces T1, T2, . . . , Tn (see FIG. 7), which in a diagram with x, y, z axes, supply on the z axis the value of the efficiency of the engine as a function of the values SA1 of the engine crank angle of ignition of the first spark plug plotted on the x-axis, and of the values SA2 of the engine crank angle of ignition of the second spark plug plotted on the y-axis.

Figure 8:
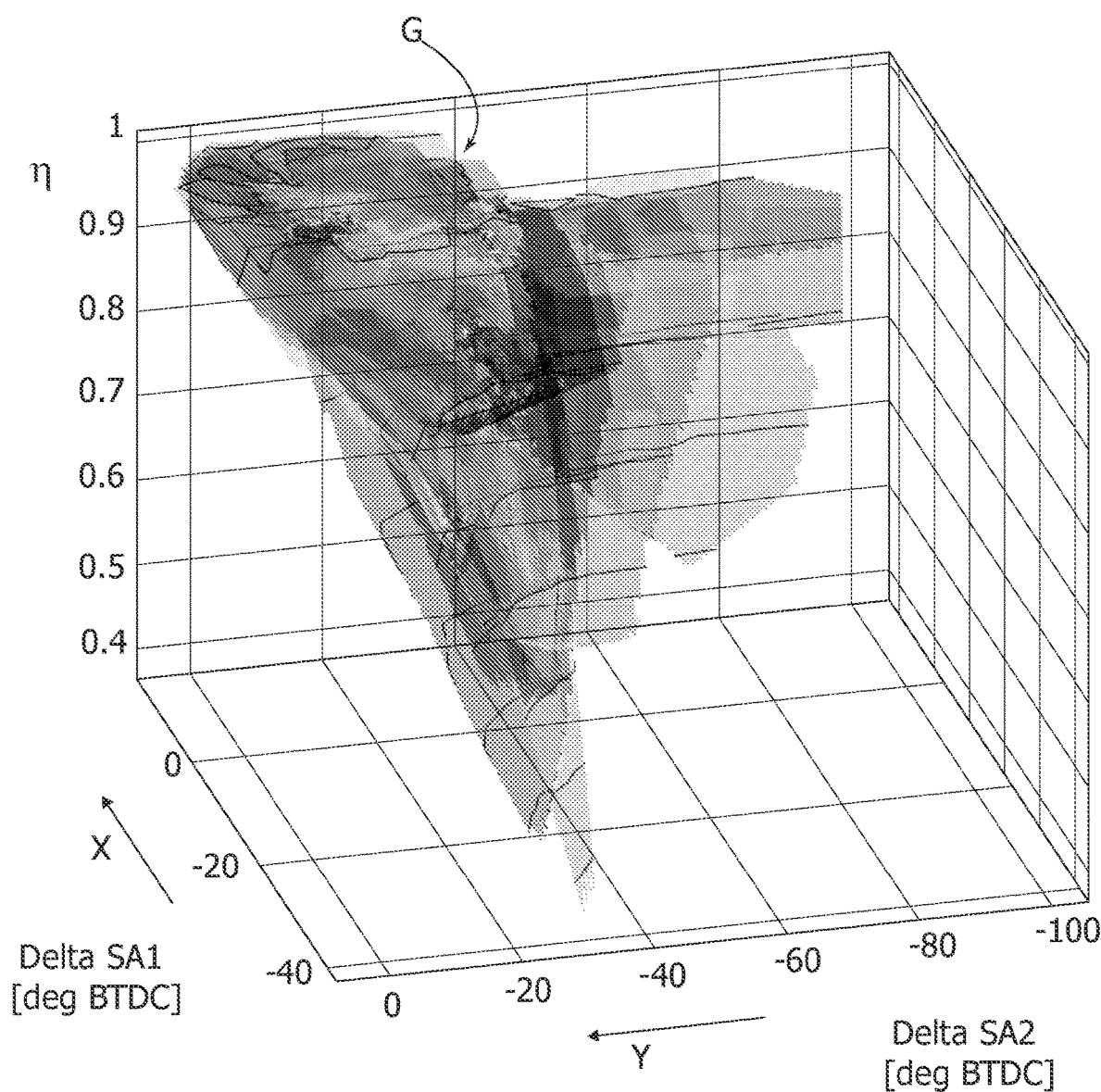

At this point, the method according to the invention envisages the operation of translating each of the aforesaid transformed three-dimensional surfaces T1, T2, . . . , Tn, parallel to the x axis and to the y axis (see FIG. 8) by assigning:
  to the x-axis the values of the differential (Delta SA1) between an optimum value (SA1 opt) of the ignition crank angle of the first spark plug for which the efficiency is unitary and the value SA2 of the ignition crank angle of the first spark plug, and
  to the y-axis the values of the differential (Delta SA2) between an optimum value (SA2 opt) of the engine crank angle of ignition of the second spark plug for which said efficiency is unitary and the value SA2 of the engine crank angle of ignition of the second spark plug, in such a way as to obtain transformed and translated three-dimensional surfaces globally indicated with the reference G in FIG. 8.

Figure 9:
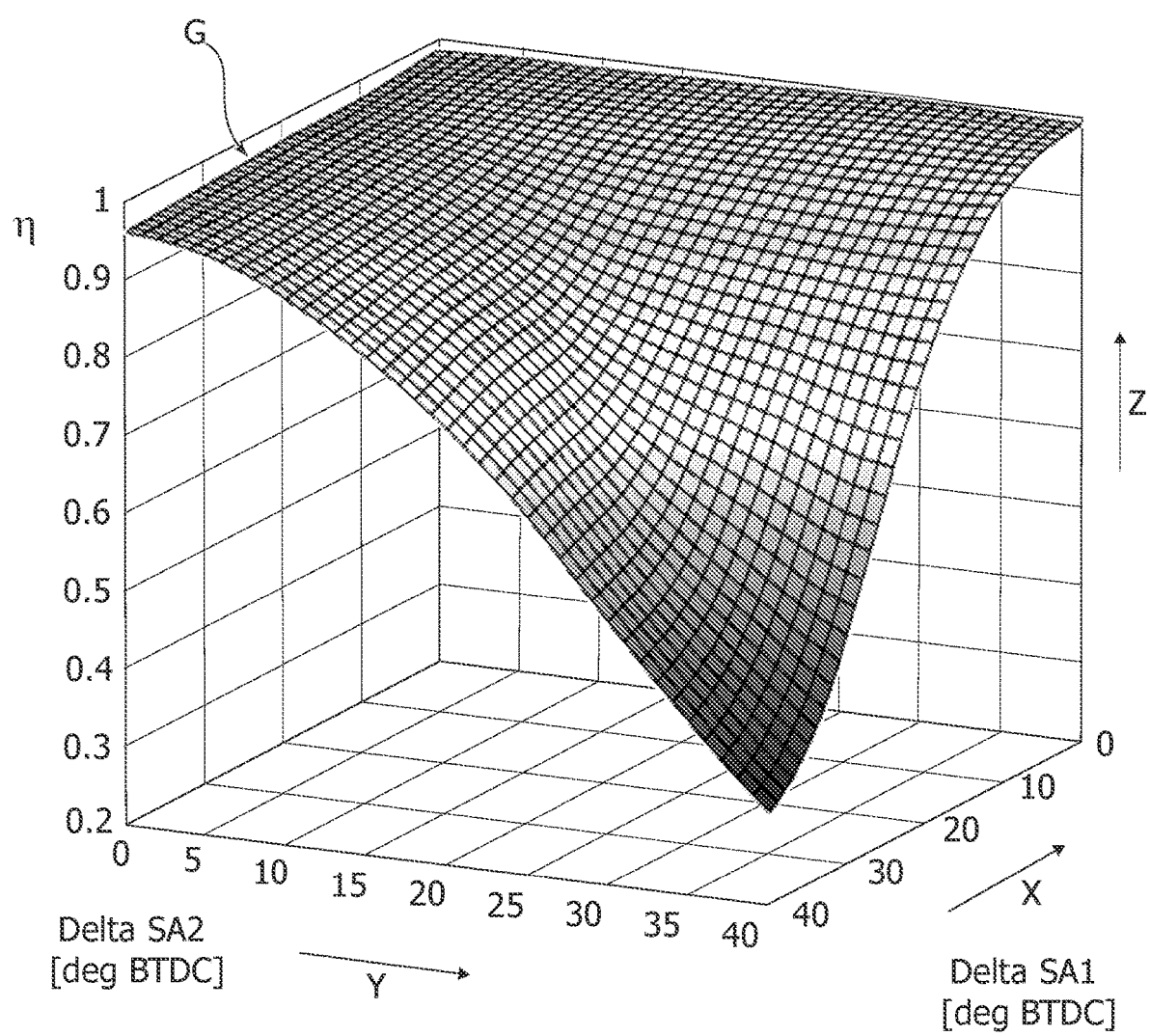

The surfaces globally indicated with G in FIG. 8 are approximated with a single normalized reference surface G (see also FIG. 9), which can be taken as a single reference, for any operating point of the engine, to determine the relationship between the torque delivered from the engine and the values SA1 and SA2 of the ignition crank angle of the first spark plug and of the ignition crank angle of the second spark plug. In FIG. 9, the single normalized reference surface G supplies the efficiency value of the engine (the maximum efficiency is 1) as a function of the Delta SA1 and Delta SA2 values expressed in degrees.

Figure 10:
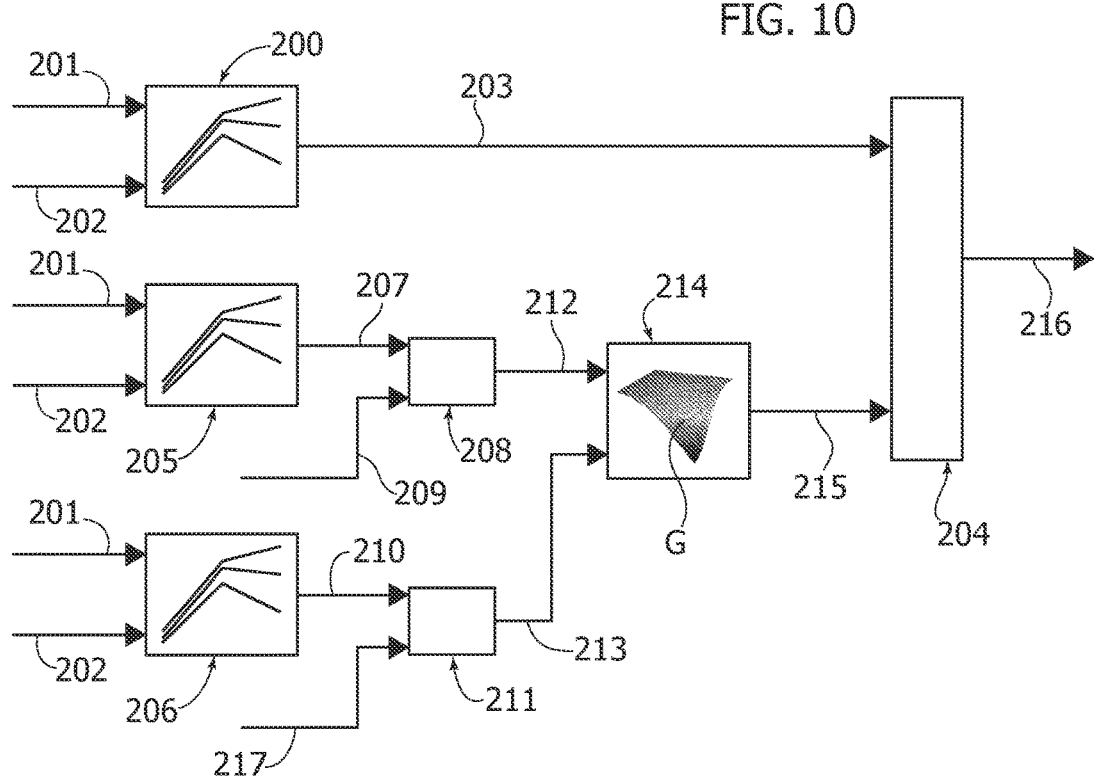

With reference to FIG. 10, in the block 200, for a determined engine operating point, i.e. as a function of signals 201, 202 containing information on the rotation speed of the engine and on the engine load, the optimum torque (Torque opt) that the engine can deliver is determined, starting from given values SA1 and SA2 of the engine crank angle of ignition of the first spark plug and of the engine crank angle of ignition of the second spark plug, on the basis of the IMEPh/MFB50 curve corresponding to the engine operating point considered, referring to a maximum value (IMEPh opt) assumed by IMEPh along said curve, where this maximum value corresponds to a maximum point of the curve or a maximum point defined by an extension of the curve obtained by extrapolation.

The signal 203 leaving the block 200 and containing the information on the optimal torque (Torque opt) is sent to a block 204 for calculating the torque delivered by the engine.

Again with reference to FIG. 10, in the blocks 205 and 206, as a function of the signals 201, 202 containing the information on the engine rotation speed and on the engine load, the optimal values SA1 opt and SA2 opt are determined of the engine crank angle of ignition of the first spark plug and of the engine crank angle of ignition of the second spark plug, for which the IMEPh value given by the aforesaid IMEPh/MFB50 curve is a maximum value, where maximum value means the value corresponding to a maximum point of the aforesaid curve or to a maximum point defined by an extension of the curve obtained by extrapolation.

The signal 207 leaving from the block 205, containing the information on the optimal value SA1 opt, is sent to a block 208 which also receives a signal 209 containing the information on the current engine crank angle of ignition of the first spark plug.

The signal 210 leaving from the block 206, containing the information on the optimal value SA2 opt, is sent to a block 211, which also receives a signal 217 containing information on the current engine crank angle of ignition of the second spark plug. Signals 212, 213 leave from the blocks 208, 211, indicative of the differential values SA1 opt–SA1 (Delta SA1) and SA2 opt–SA2 (Delta SA2).

Again, with reference to FIG. 10, in the block 214, on the basis of the aforesaid single normalized surface G (FIG. 9), an efficiency value of the engine is determined as a function of the calculated values Delta SA1 and Delta SA2. The signal 215 leaving the block 214 and containing the information on the efficiency of the engine in the conditions considered, is sent to the block 204, which, on the basis of the signal 215 indicative of the efficiency of the engine and of the signal 203 indicative of the optimal torque (Torque opt), is consequently capable of outputting a signal 216 containing information on the effective torque delivered by the engine.

Figure 11:
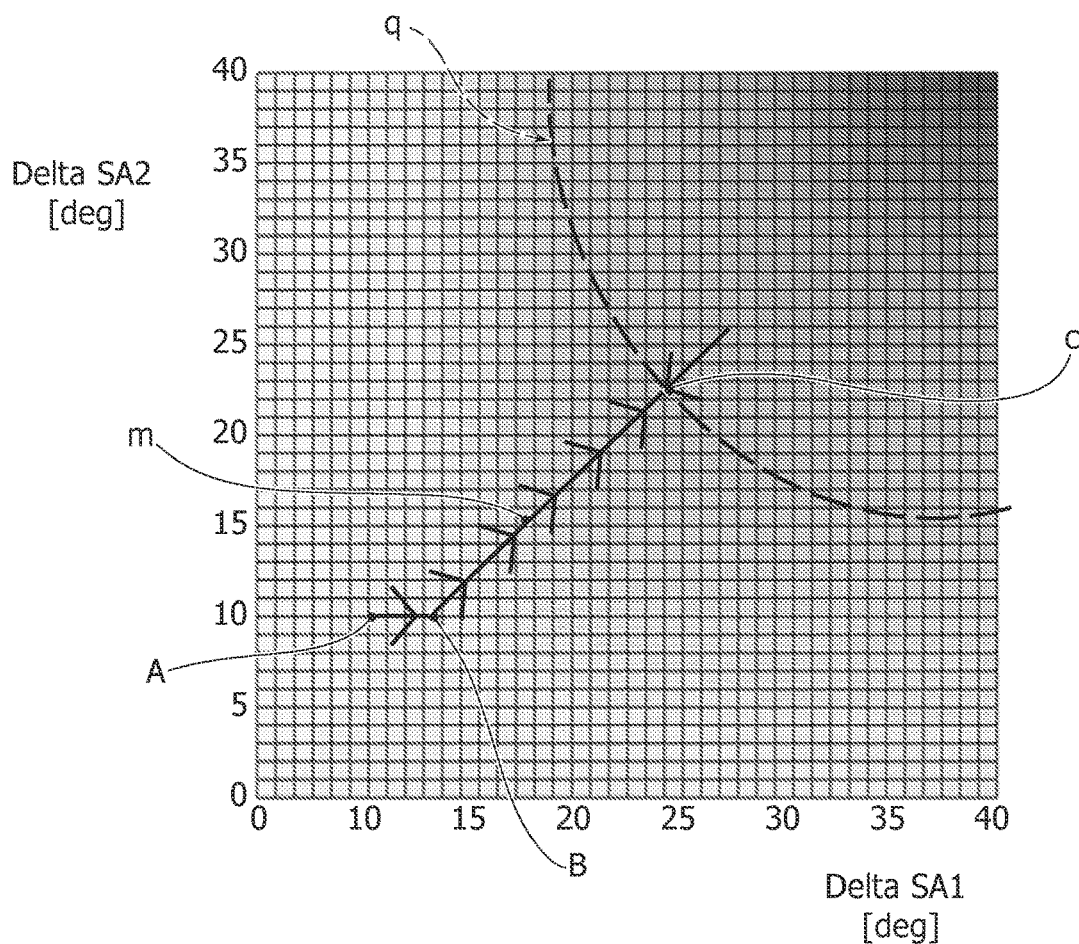
FIGS. 11-13 are diagrams illustrating further embodiment examples of the method according to the invention.

FIG. 11 illustrates the projection onto the xy plane of the normalized reference surface G. In the xy plane illustrated in FIG. 11, the zero value of Delta SA1 and the zero value of Delta SA2 correspond to the condition wherein the engine crank angle of ignition of the first spark plug and the engine crank angle of ignition of the second spark plug are the optimal values, at which the engine efficiency has value 1. In the diagram of FIG. 11, it is therefore possible to identify lines, such as for example the line q, the points of which correspond to the same value of the engine efficiency. In other words, a variation of the Delta SA1 and Delta SA2 values, which corresponds to a point always situated on the line q always gives rise to the same efficiency value of the engine.

During engine operation, the diagram of FIG. 11 is taken as a base reference to determine how to vary the engine crank angle of ignition of the first spark plug and the engine crank angle of ignition of the second spark plug, in order to reach a point in the diagram with an efficiency value corresponding to a given target value of the torque delivered by the engine. Assuming, for example, that the starting condition of the engine corresponds to the point indicated with A in FIG. 11, the Delta SA1 and Delta SA2 values are varied by the electronic controller of the engine in order to travel the predetermined path indicated by m in FIG. 11, which starting from point A, first reaches a point B (through a variation of Delta SA1, without variation of Delta SA2) and then from point B to a target point C moving on a straight line, which in this example is inclined at 45° with respect to the x, y axes of the diagram (which corresponds to varying Delta SA1 in an identical way to varying Delta SA2).

The predetermined path m is chosen on the basis of empirical data in such a way as to favor combustion stability and consequently reduce the cyclic dispersion of the torque delivered by the engine.

Figure 12:
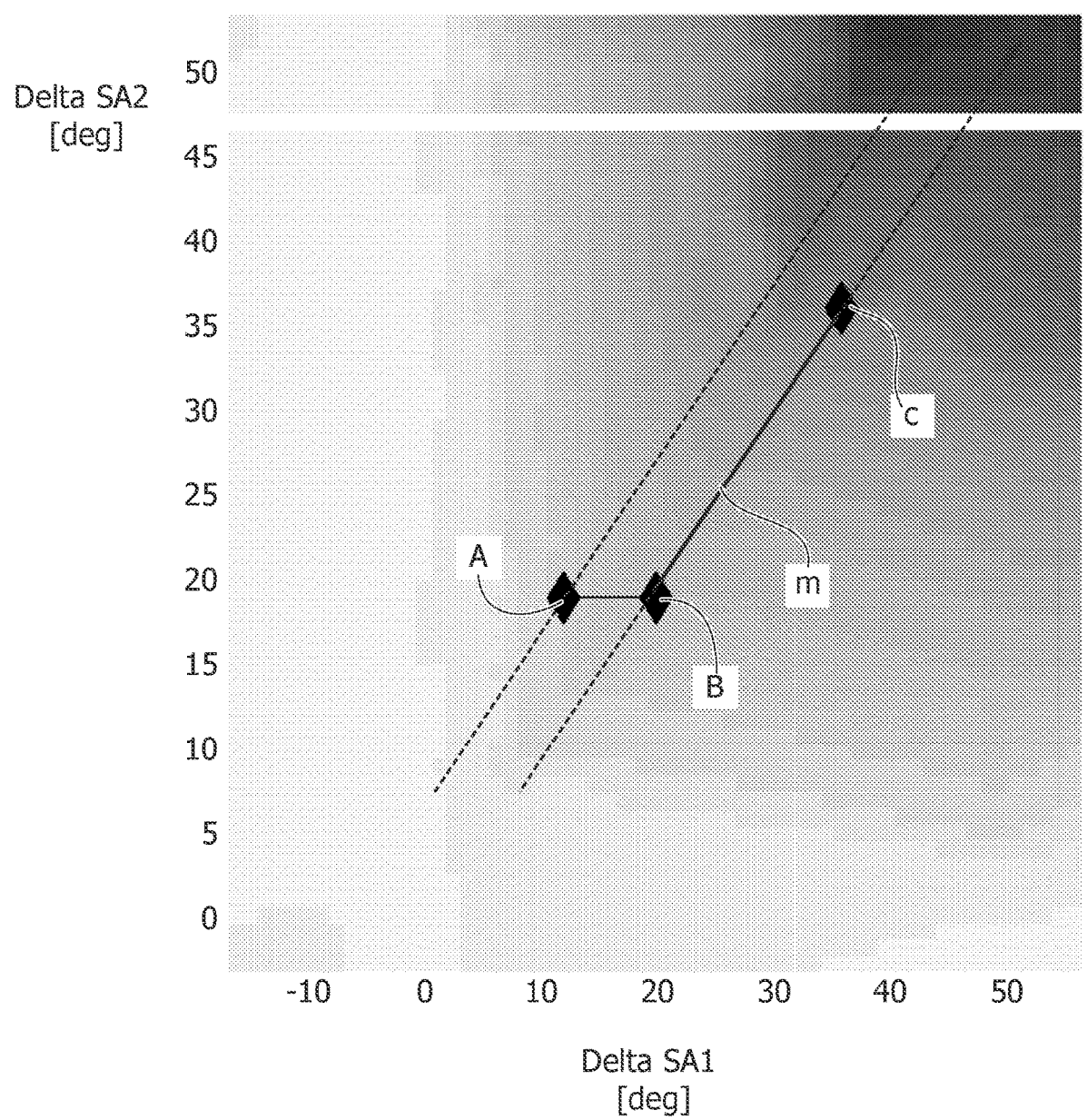
Figure 13:
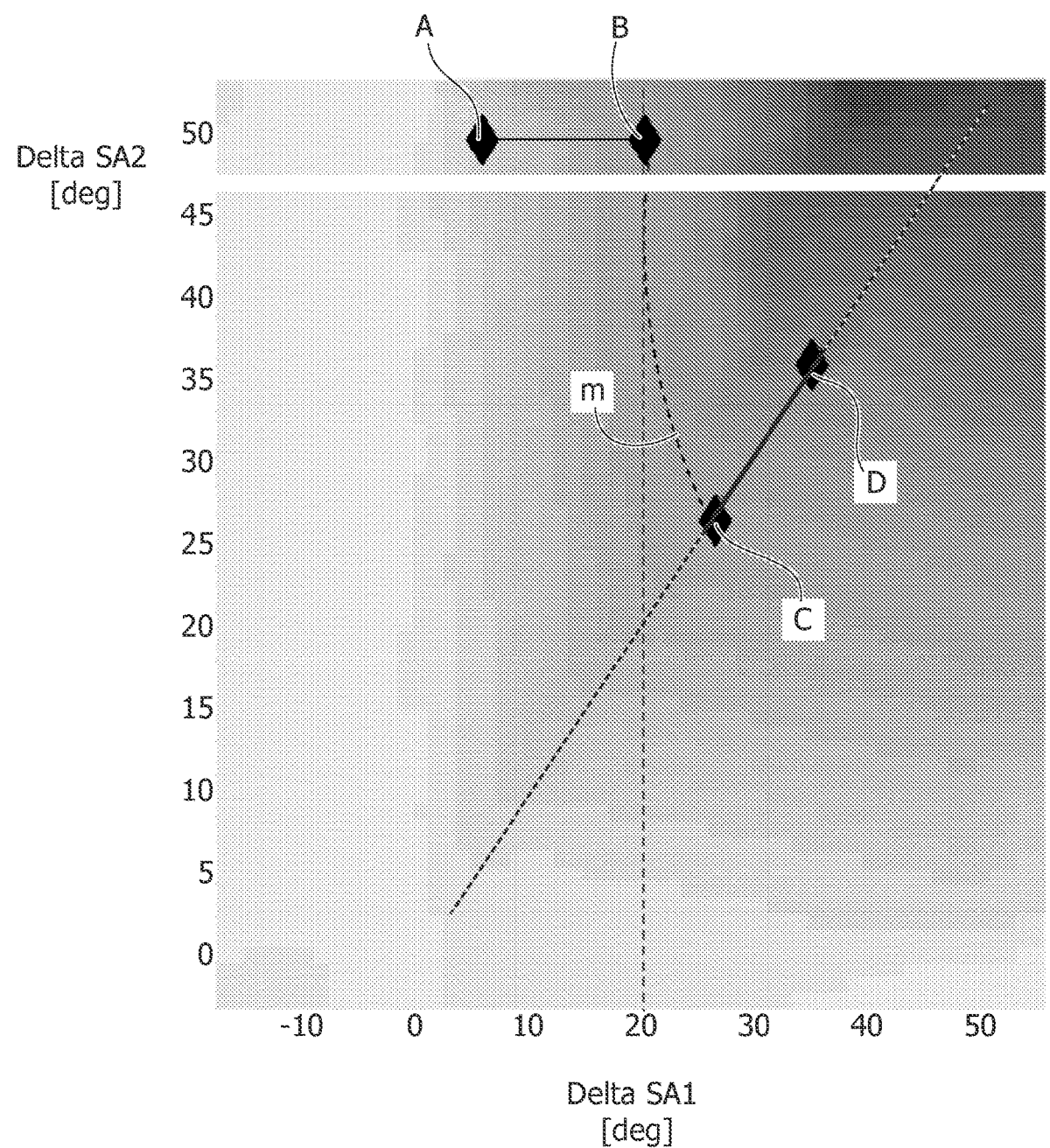

FIGS. 12, 13 illustrate two further examples of predetermined paths to be followed in the projection on the xy plane of the normalized reference surface G. Each trajectory starts from a point A, passes through a point B and arrives at a point C. In the case of FIG. 12, the first section AB is covered by keeping the Delta SA2 value constant, and varying only the Delta SA1 value, after which a straight line inclined at 45° is followed, in a similar way to what has been illustrated in FIG. 11.

In the case of FIG. 13, point 1 is the start, in a condition wherein only the first spark plug is ignited. In this condition, the Delta SA1 value is varied until it reaches point B, after which the curved path BC is followed by also triggering the second spark plug and varying both the Delta SA1 and Delta SA2 values. From point C to the final point D, a straight line is followed, varying both the Delta SA1 and Delta SA2 values until reaching a point with an engine efficiency corresponding to the target value of the torque delivered.

As is evident from the preceding description, the method according to the invention makes it possible to manage spark plug ignition control in a gasoline internal combustion engine wherein each cylinder is equipped with two spark plugs, in any case referring to a single normalized surface (surface G of FIG. 9), usable for any operating point of the engine, which gives the advantage of simplifying the control of the engine, while still guaranteeing the reliability and robustness of the control method.

Of course, without prejudice to the principle of the invention, the details of construction of the engine and the embodiments of the method may vary widely with respect to those described and illustrated purely by way of example, without departing from the scope of the present invention, as defined by the attached claims.

What is claimed is:

1. A method for controlling operation of a gasoline internal combustion engine,
   wherein said engine comprises:
   a crankcase having a plurality of cylinders and a cylinder head defining a combustion chamber and a combustion pre-chamber associated with each cylinder of the plurality of cylinders, and a plurality of pistons movable within the cylinders and operatively connected to an engine shaft, and a first spark plug and a second spark plug associated with the combustion pre-chamber and the combustion chamber of each cylinder, respectively, wherein said method comprises operations of:

controlling, for each cylinder, in each cylinder operating cycle, an ignition of the first spark plug at a given engine crank angle (SA1) and an ignition of the second spark plug at a given engine crank angle (SA2), depending on an engine load and an engine rotational speed, and depending on a required value of a torque delivered by the engine, determining said engine crank angle (SA1) of ignition of the first spark plug and said engine crank angle (SA2) of ignition of the second spark plug on a basis of the following operations:

empirically detecting, for said engine, a plurality of three-dimensional reference surfaces, in a diagram with three orthogonal axes x, y, z, wherein each three-dimensional reference surface corresponds to a respective engine operating point including a determined pair of values of engine rotational speed and engine load, and wherein each of said three-dimensional reference surfaces provides, on the z axis, a value of a gross indicated mean effective pressure (IMPEh) obtained at each operating cycle inside the cylinder, as a function of a value reported on the x axis of the engine crank angle (SA1) of ignition of the first spark plug, and a value reported on the y axis of the engine crank angle (SA2) of ignition of the second spark plug, empirically determining, for each of the engine operating points, and as a function of the engine crank angle (SA1) at which the first spark plug is ignited and the engine crank angle (SA2) at which the second spark plug is ignited, a value of the engine crank angle at which 50% of a mass of fuel is burnt (MFB50), on a basis of the empirically detecting and empirically determining operations, for each of the engine operating points, defining a respective IMEPh/MFB50 curve of a variation of said gross indicated mean effective pressure (IMPEh) as a function of the value of the engine crank angle at which 50% of the fuel mass is burnt (MFB50), calculating, for each point on said IMEPh/MFB50 curve, a ratio between a value of IMEPh at that point and a maximum value of IMEPh along said IMEPh/MFB50 curve, where said maximum value of IMEPh corresponds to a maximum point on said IMEPh/MFB50 curve or to a maximum point defined by an extension of said IMEPh/MFB50 curve obtained by extrapolation, taking said ratio as representative of a value of an efficiency of the engine, corresponding substantially to a ratio between a torque delivered by the engine and an optimum torque, which would be delivered for said maximum value (IMEPh opt) of IMEPh, on a basis of said calculating, transforming each of said three-dimensional reference surfaces, into a transformed three-dimensional surface, which, in a diagram with axes x, y, z, provides on the z axis the value of said efficiency of the engine, as a function of the value of the engine crank angle (SA1) of ignition of the first spark plug on the x axis and of the value of the engine crank angle (SA2) of ignition of the second spark plug on the y axis, translating each of said transformed three-dimensional surfaces, parallel to the x-axis and the y-axis, assigning:

to the x-axis values of a differential (Delta SA1) between an optimum value (SA1 opt) of an ignition crank angle of the first spark plug for which said engine efficiency is unitary, and the value of the ignition crank angle (SA1) of the first spark plug, and to the y axis values of a differential (Delta SA2) between an optimum value of an engine crank angle (SA2 opt) of ignition of the second spark plug for which said engine efficiency is unitary, and the value (SA2) of the engine crank angle of ignition of the second spark plug, defining a single normalized reference surface which approximates said transformed and translated three-dimensional surfaces, said single normalized reference surface being used to determine, as a function of the engine operating point, a relationship between torque delivered by the engine and values of the engine crank angle of ignition (SA1) of the first spark plug and of the engine crank angle of ignition (SA2) of the second spark plug, and determining values of the engine crank angle (SA1) of ignition of the first spark plug and of the engine crank angle (SA2) of ignition of the second spark plug using said single normalized reference surface, so as to reach a target value of torque delivered at a given operating point of the engine.

2. The method according to claim 1, wherein starting from determined values of the engine crank angle (SA1) of ignition of the first spark plug and/or the engine crank angle of ignition (SA2) of the second spark plug, and for a determined engine operating point, the optimal torque (Torque opt) which the engine can deliver is determined on a basis of the IMEPh/MFB50 curve corresponding to the determined engine operating point, by referring to the maximum value (IMPEh opt) assumed by IMEPh along said IMEPh/MFB50 curve, where said maximum value corresponds to a maximum point of said IMEPh/MFB50 curve or to a maximum point defined by an extension of said IMEPh/MFB50 curve obtained by extrapolation.

3. A The method according to claim 2, wherein for a determined engine operating point, optimal values of the engine crank angle (SA1) of ignition of the first spark plug and the engine crank angle (SA2) of ignition of the second spark plug are determined, for which the value of IMEPh given by said IMEPh/MFB50 curve is the maximum value, wherein said maximum value corresponds to the maximum point defined by said IMEPh/MFB50 curve or to the maximum point defined by the extension of said curve obtained by extrapolation.

4. The method according to claim 3, wherein starting from determined values of the engine crank angle (SA1) of ignition of the first spark plug and the engine crank angle (SA2) of ignition of the second spark plug, and upon determining the optimal values and of said engine crank angles, the differentials Delta SA1 and Delta SA2 are calculated.

5. The method according to claim 4, wherein, on a basis of said single normalized reference surface, the value of efficiency of the engine is determined as a function of said calculated values of the differentials Delta SA1 and Delta SA2, and in that on a basis of said efficiency value of the engine and of said determined value of the optimal torque (Torque opt) which the engine can deliver, the value of the torque delivered by the engine is determined.

6. The method according to claim 1, wherein in any engine operating condition, starting from given values of the engine crank angle (SA1) of ignition of the first spark plug and the engine crank angle (SA2) of ignition of the second spark plug, said given values are varied on a basis of said single normalized reference surface, moving on said surface according to a predetermined path, so as to arrive at a point on the single normalized reference surface with an engine efficiency value corresponding to a given target value of the torque delivered by the engine.

7. The method according to claim 6, wherein said predetermined path corresponds to a sequence of lines in an xy plane of a diagram of said normalized reference surface, including at least one straight line inclined at 45° with respect to the x, y axes, along which variation of the differential Delta SA1 is equal to variation of the differential Delta SA2.

8. The method according to claim 6, wherein said predetermined path is chosen on a basis of empirical data, so as to favor a stable combustion, reducing cyclic dispersion of the torque delivered by the engine.

9. A gasoline internal combustion engine, comprising:
the crankcase having the plurality of cylinders and the cylinder head defining the combustion chamber and the combustion pre-chamber associated with each cylinder, and the plurality of pistons movable within the cylinders and operatively connected to the engine shaft,
the first spark plug and the second spark plug associated with the combustion pre-chamber and with the combustion chamber of each cylinder, respectively, and
an electronic controller configured to implement the method according to claim 1.

\* \* \* \* \*